United States Patent Office 3,540,198
Patented Nov. 17, 1970

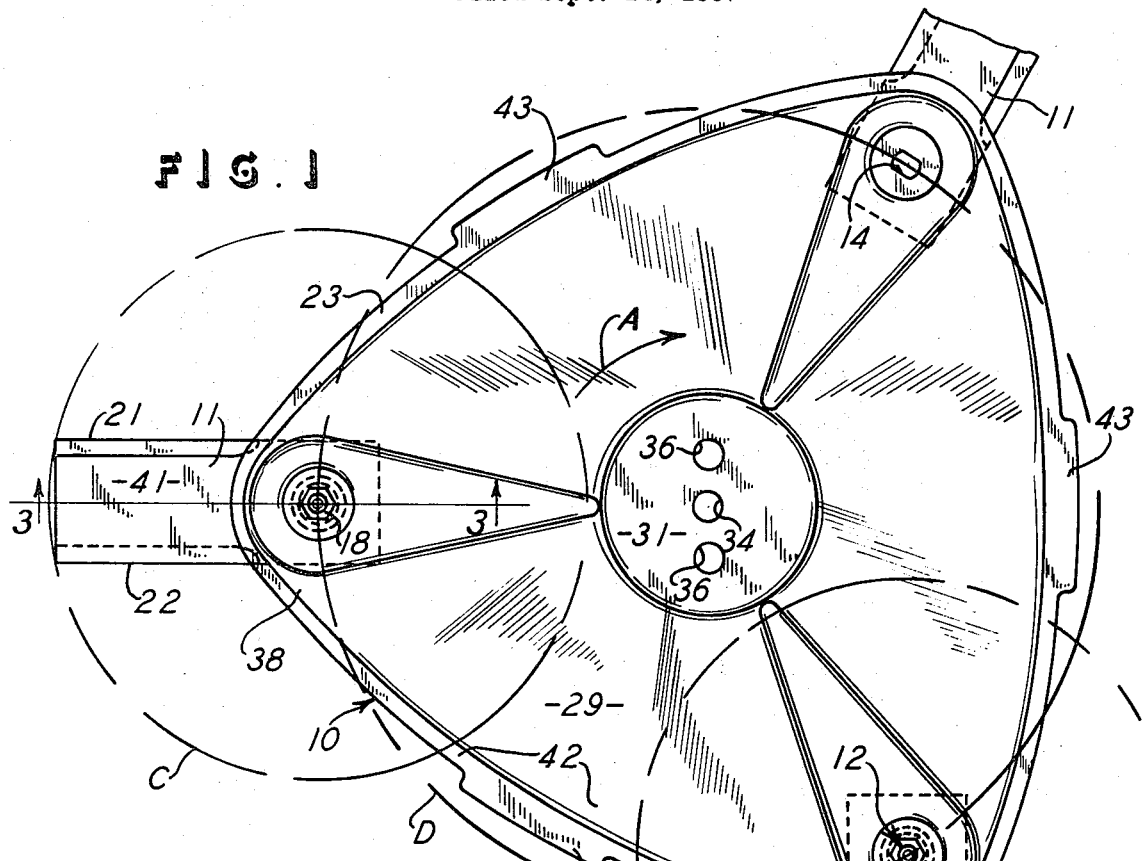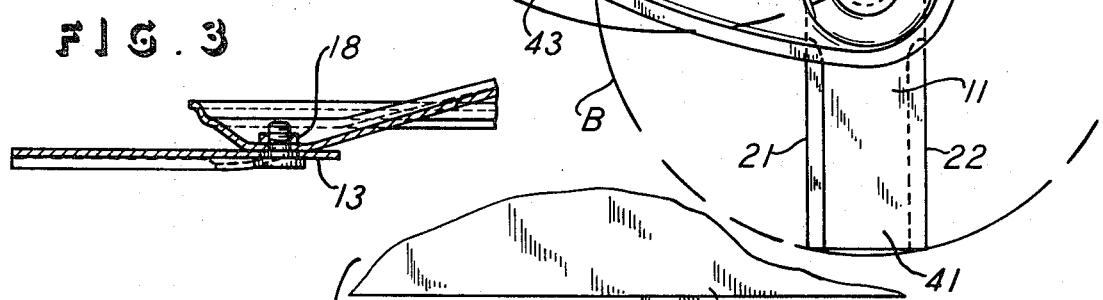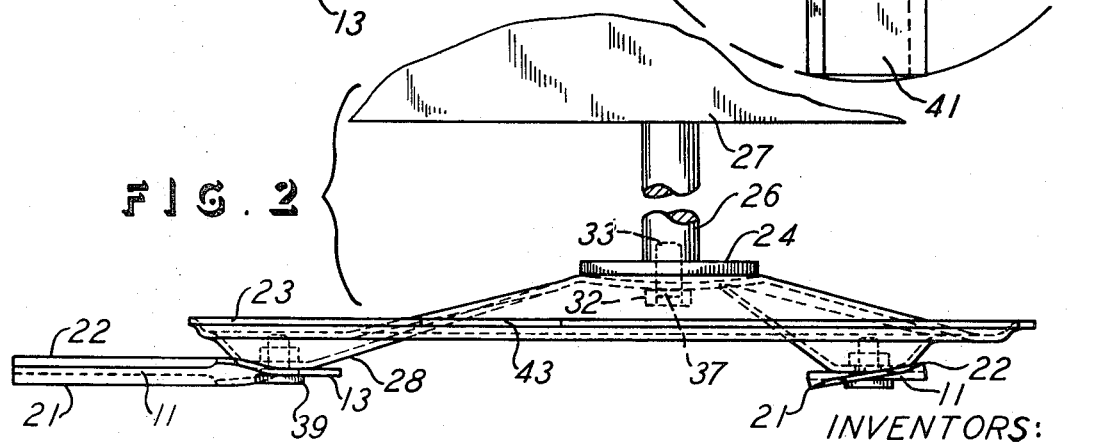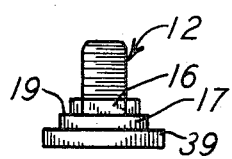

3,540,198
SWING KNIFE ASSEMBLY FOR A ROTARY
MOWER
Sherman C. Heth, Vernon R. Kaufman, and Donald G. Erickson, Racine, Wis., assignors to Jacobsen Manufacturing Company, Racine, Wis., a corporation of Wisconsin
Filed Sept. 14, 1967, Ser. No. 667,820
Int. Cl. A01d 55/18
U.S. Cl. 56—295                               3 Claims

ABSTRACT OF THE DISCLOSURE

A swing knife assembly for a rotary mower, with the assembly including a disc and several cutting blades rotatably mounted on the disc. The disc and blade assembly is mountable in a rotary mower (not shown) and is driven by a prime mover, such as a gasoline engine.

BACKGROUND OF THE INVENTION

This invention relates to a swing knife assembly for a rotary mower. Rotors, or assemblies of discs and cutting blades, are very commonly used in rotary mowers. These mowers are commonly used for cutting grass, and the cutting blades are preferably disposed in a fixed position with respect to the supporting disc, but the blades may pivot on the disc when they strike a foreign obect. The blades therefore pivot away from the direction of rotation of the assembly, and the blades are therefore protected from damage.

The present invention relates to a swing knife assembly where the blades are mounted on the disc for complete circular rotation about the mounting pins. This therefore presents the blades in an extended position beyond the disc for the desired cutting of grass, particularly tall grass or weeds, and the blades can readily rotate backwards with respect to the direction of disc rotation, when the blades strike a foreign obect. It is also desirable that the blades can all simultaneously rotate 360° about their mounting pins, and they have clearance with respect to each other and with respect to any part of the mounting disc. Still further, the blades have their cutting edges extending along the entire length of the blades from the edge of the disc to the tip of the blades, so maximum cutting efficiency can be achieved by the assembly. Still further, the disc is shaped, such as the triangular shape shown, so that the intermediate portion between every two blades on the disc does not extend outwardly to engage uncut grass as the mower advances forwardly and while the assembly is rotating.

The blades of the present invention are arranged to be reversible to thereby have two cutting edges on each blade, and the blades are twisted along their length so that they are pitched to direct a flow of air upwardly during the rotation of the assembly. This feature of creating an upwardly flow of air is accomplished in light of the aforementioned features, particularly the ability of the blade to rotate 360° about its mounting pin without striking another blade or any part of the supporting disc.

Also, the disc itself is shaped to be of maximum strength for minimum weight of the disc, and, as referred to above, the disc is shaped to avoid interference with the oribital cutting paths of the cutting blades moving about the central axis of the disc.

The disc of the present invention is further arranged for accurate and easy dynamic balancing of the entire assembly. Specifically, projections or tangs are provided on the disc so that they can be cut off in proper amounts for the desired dynamic balancing.

BRIEF DESCRIPTION OF THE DRAWING

FIG. 1 is a top plan view of a preferred embodiment of an assembly, of this invention, with two of the blades shown either broken away or in a slightly rotated position from the normal cutting position.

FIG. 2 is a side elevational view of FIG. 1 with the engine part added thereto.

FIG. 3 is a sectional view taken along the line 3—3 of FIG. 1.

FIG. 4 is a side elevational view of the bolt or mounting pins used herein.

DETAILED DESCRIPTION OF THE PREFERRED EMBODIMENT

The swing knife assembly basically includes the disc, generally designated 10, and three cutting blades generally designated 11. The blades are mountetd on the disc 10 to be completely rotatable about mounting pins or bolts 12 which extend through the planar shanks 13 of the blades 11 and through oblong openings 14 in the disc 10. Thus the blades 11 can rotate 360° about the axis of the respective pins 12, and the pins 12 have corresponding flat sides 16, that is they are shaped in their shank portions so that the pins 12 are snugly received in the oblong shaped openings 14 to be non-rotatable on the disc 10. The pins therefore can be suitably hardened, and they provide the rotation bearing for the respective blades 11 when the latter is subjected to centrifugal force, or when the blades 11 strike an object and tend to bounce backward with regard to direction of rotation of the assembly, as indicated by the arrow A in FIG. 1.

The pins 12 have circularly shaped shank portions 17 which nest within similarly shaped openings in each of the blades 11 to present the rotation mounting mentioned. The height of the pin portions 17, or the length thereof, is slightly greater than the thickness of the blade 11 in its planar portion 13, so the blade 11 is assured adequate guidance but also freedom for the rotation in a complete circle about the axis of the pin 12, and such circle is designated by the line B and the line C, with regard to two of the blades 11 shown in FIG. 1. Thus, when the nut 18 is tightened on the pin 12 which is of course threaded to receive the nut, the pin 12 presents a shoulder or limit stop designated 19 which prevents the bolt or pin 12 from being tightened to a point which would preclude rotation of the blades 11 about the pins 12. The blades 11 therefore are always assured of adequate support to project horizontally from the disc 10, and to be sufficiently free to rotate completely around the pins 12.

It will also be noted that the rotation circles B and C extend to be spaced from each other a distance of approximately only one quarter of the diameter of the circles B and C. Therefore, the blades 11 are of a length to present considerable cutting portions in their cutting edges 21 and 22, when the blade is inverted. However, the blades do not strike each other, nor do they strike any part of the supporting member or the disc 10 during the complete rotation which may occur when the blades 11 strike a foreign object, as mentioned.

Also, note that the cutting edges 21 and 22 extend for the entire length of the blades 11 beyond the radial extent of the disc 10. This presents maximum cutting edge and provides maximum cutting efficiency in the assembly.

The disc 10 is provided with a peripheral lip or flange 23 which extends in a horizontal plane when the assembly is mounted on the plate 24 depending from shaft 26 driven by a prime mover, such as the shown fragment of an engine 27. Also, the disc has depending pads 28 which provide the desired surface support for the horizontal extension of the blades 11, as mentioned.

The disc 10 has an intermediate portion 29 and a circular portion 31 which mates with the plate 24 for the rotational mounting with the engine 27. A bolt 32 extends through the disc 10 and into a central opening 33 in the shaft 26, as the bolt passes through the disc central opening 34. The disc 10 also has openings 36 which mate with pins, such as the indicated pin at 37 in FIG. 2, so that rotational motion can be transmitted from the plate 24 to the disc 10, as desired.

FIG. 1 therefore shows that the shape of the disc 10 is substantially triangular or trochoid, and it presents the three corners, as indicated at 38 in FIG. 1, for the mounting of the three blades 11. The pins 12 are disposed on the pin or bolt circle designated D, and one will note that the intermediate portions of the disc 10 between every two blades 11 do not extend beyond the circle D. That is, the disc lip 23 is within the limit of the circle D, and therefore the disc does not interfere with the cutting action of the blades 11 when the mower and entire assemble is advanced in cutting motion. Thus the swing knife feature is such that the blades are given maximum exposure and maximum support by a disc of minimum size and weight. Of course the pads 28, in cooperation with the pin or bolt heads 39, support the extended blades 11 in the desired horizontal position beyond the edge of the disc 10. The blades 11 can therefore readily react to centrifugal force to extend them radially outwardly, as shown by the position of the one blade on the left as viewed in FIG. 1.

The blades 11 are also twisted or offset with respect to their longitudinal center lines or axes, as best indicated in the two blades shown in FIG. 2. Thus the active blade cutting edge 21 is disposed in the lower-most portion of the assembly, and the blade extended or body portion 41 is directed upwardly to the rear, with respect to direction of rotation. This produces an airlift of the ambient air in the rotation of the assembly, and therefore maximum efficient cutting action is achieved. Simultaneously, the blades 11 can be reversed for the same action and position described, and again the airlift feature will be achieved in the inverting of the blade 11. Still further, the disc pad portion 28 is depending from the disc 10 and shaped so that the planar blade portion 13 rotates over the pad 28 while the blade extended portion 41 is disposed only beyond the pad 28 to clear the pad 28 in the circular rotation of the blade 11.

The disc periphery or lip 23 on each of its sides intermediate every two cutting blades, and designated 42, has a projection or tang 43. This tang 43 is available on each of the three sides to be cut off for dynamic balancing of the assembly, as necessary or desired.

What is clamed is:

1. A swing knife assembly for a rotary mower driven by a prime mover, comprising a disc having an endless rim disposed completely on a first plane, at least three pads included in said disc and terminating in planar surfaces offset to one side of said first plane and with said surfaces being parallel to said first plane and adjacent said rim, said pads having bolt holes therethrough and centrally of said surfaces, said disc including a mounting portion offset from said rim and to the side thereof opposite said one side and being centrally located on said disc and having a circular surface parallel to said first plane, a cutting blade for each of said pads and having a planar shank portion with a bolt hole therethrough and having a twisted cutting-end portion, a mounting bolt for each of said blades for pivotally mounting the latter on said disc, said planar shank portion extending beyond said planar surfaces of said pads, said twisted cutting-end portions extending beyond said rim and to a second plane parallel to said first plane and to the side of the plane of said planar shank portions away from said rim, the amount of twist of said blades being less than the height of said pads and with said blades being of a length to extend from said bolts and toward the center of said disc and clear of each other by at least the diameter of said circular surface on said disc, all for 360 degree rotation of said blades about said bolts.

2. The subject matter of claim 1, wherein a total of three said cutting blades are mounted on said disc in a triangular pattern, and said disc is triangularly shaped and presents radially extending corners for the location of said bolts for the rotational mounting of said blades on said bolts.

3. The subject matter of claim 1, including a radially extending tang on said rim of said disc intermediate every two of said blades and adaptable to be cut off for dynamic balancing of said assembly.

References Cited

UNITED STATES PATENTS

| | | | |
|---|---|---|---|
| 2,860,474 | 11/1958 | Cyr | 56—255 X |
| 2,963,844 | 12/1960 | Engler | 56—25.4 X |
| 3,112,599 | 12/1963 | Brewer | 56—295 |
| 2,815,631 | 12/1957 | Northcote | 56—25.4 |

ROBERT PESHOCK, Primary Examiner

R. F. CUTTING, Assistant Examiner